United States Patent [19]
Curiger et al.

[11] Patent Number: 5,862,354
[45] Date of Patent: *Jan. 19, 1999

[54] UNIVERSAL ASYNCHRONOUS RECEIVER/ TRANSMITTER (UART) SLAVE DEVICE CONTAINING AN IDENTIFIER FOR COMMUNICATION ON A ONE-WIRE BUS

[75] Inventors: Andreas Curiger, Dallas; Wendell L. Little, Denton; Matthew K. Adams, Dallas, all of Tex.

[73] Assignee: Dallas Semiconductor Corporation, Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 611,035

[22] Filed: Mar. 5, 1996

[51] Int. Cl.$^6$ ...................................................... G06F 13/00
[52] U.S. Cl. ............................ 395/290; 395/306; 395/309
[58] Field of Search .......................... 340/825.06, 825.14, 340/825.31; 375/222, 216; 395/200.09, 280, 290, 306, 309, 882; 364/491

[56] References Cited

U.S. PATENT DOCUMENTS

| | | | |
|---|---|---|---|
| 4,429,409 | 1/1984 | Berry et al. ................................. | 378/45 |
| 4,468,751 | 8/1984 | Plunkett, Jr. ............................... | 360/55 |
| 4,556,958 | 12/1985 | Ugon .................................... | 395/185.02 |
| 4,573,115 | 2/1986 | Halgrimson ............................. | 364/138 |
| 4,621,190 | 11/1986 | Saito et al. ................................ | 235/492 |
| 4,740,955 | 4/1988 | Litterer et al. ............................ | 370/67 |
| 4,835,630 | 5/1989 | Freer ........................................ | 360/69 |
| 4,930,065 | 5/1990 | McLagan et al. ....................... | 395/870 |
| 5,045,675 | 9/1991 | Curry ...................................... | 235/441 |
| 5,123,107 | 6/1992 | Mensch, Jr. ............................. | 364/491 |
| 5,179,661 | 1/1993 | Copeland, III et al. ................ | 395/250 |
| 5,210,846 | 5/1993 | Lee .......................................... | 395/280 |
| 5,387,903 | 2/1995 | Cutter et al. ....................... | 340/825.31 |
| 5,398,326 | 3/1995 | Lee .......................................... | 395/431 |
| 5,432,711 | 7/1995 | Jackson et al. ..................... | 364/514 R |
| 5,438,681 | 8/1995 | Mensch, Jr. ............................. | 364/491 |
| 5,495,240 | 2/1996 | Heberle .............................. | 340/870.13 |
| 5,506,965 | 4/1996 | Naoe ................................... | 395/200.17 |
| 5,552,777 | 9/1996 | Gokcebay et al. ................. | 340/825.31 |
| 5,594,430 | 1/1997 | Cutter et al. ....................... | 340/825.31 |

OTHER PUBLICATIONS

Rao, G.V., Microprocessors and Microcomputer Systems, N.Y., Van Nostrand Reinhold, pp. 98–100, QA 76.5 R36 1978.

Dallas Semiconductor Company, DS87C90024—Pin SOIC Lock Processor—Sytem Specification, CMOS 8–Bit EPROM/ROM Microcontroller, dated Aug. 4, 1995.

*Primary Examiner*—Lance Leonard Barry
*Attorney, Agent, or Firm*—Jenkens & Gilchrist

[57] ABSTRACT

A processor system is disclosed wherein said processor system is adapted to communicate over at least one one-wire network utilizing one-wire communications protocol. For the embodiment of the invention in which the processor system acts as a network master, the processor system includes a master UART especially configured to control communications over such network according to one-wire protocol. For the embodiment of the invention in which the processor communicates over two one-wire networks, the processor system includes a first UART which acts as a slave and a second UART which acts as a master.

15 Claims, 3 Drawing Sheets

UNIVERSAL ASYNCHRONOUS RECEIVER/ TRANSMITTER (UART) SLAVE DEVICE CONTAINING AN IDENTIFIER FOR COMMUNICATION ON A ONE-WIRE BUS

CROSS REFERENCE TO RELATED APPLICATIONS

This application is related to the following U.S. patent applications:

|                      | TITLE                         | INVENTOR (S)  |
|----------------------|-------------------------------|---------------|
| U.S. Patent No. 5,758,060 | Hardware for Verifying Software | Little et al. |
| Ser. No. 08/611,036  | Programmable Adaptive Timing  | Curry et al.  |

All of the related applications are filed on even date herewith, are assigned to the assignee of the present invention, and are hereby incorporated herein in their entirety by this reference thereto.

The following applications and patents of common assignee contain related subject matter and all of which are hereby incorporated by reference:

| Ser. Nos.   | Title                                                              | Inventor (s)    |
|-------------|--------------------------------------------------------------------|-----------------|
| 08/346,556  | Electrical/Mechanical Access Control Systems and Methods           | Glick et al.    |
| 08/220,425  | Electrical/Mechanical Access Control Systems and Methods           | Glick et al.    |
| 08/492,660  | Electronic Key with Three Modes of Electronic Disablement          | Pearson et al.  |
| 08/331,255  | One-Wire Bus Architecture                                          | Lee             |
| 08/347,913  | Systems and Methods to Convert Signal Multi-plexed on a Single Wire to Three Wire | Lee |
| 08/347,912  | Command Data Protocol                                              | Lee             |

| U.S. Pat. Nos. | Title                          | Inventor (s) |
|----------------|--------------------------------|--------------|
| 5,210,846      | One-Wire Bus Architecture      | Lee          |
| 5,398,326      | Method for Data Communication  | Lee          |

BACKGROUND OF THE INVENTION

1. Technical Field of the Invention

This invention relates to microprocessor related circuitry. More specifically, this application relates to universal asynchronous receiver/transmitters (UARTs) that operate in conjunction with microprocessors. The UARTs of exemplary embodiments of the present invention incorporate one-wire bus technology and protocol which was developed by the Dallas Semiconductor Corporation. More specifically still, the present invention includes a one-wire UART design operating in conjunction with a microprocessor that is for use in an access control system, such as a locking mechanism. The locking mechanism can be networked.

2. Description of Related Art

Many microprocessor based circuits must communicate via data buses to other electronic devices. A universal asynchronous receiver/transmitter (UART) is used in many circumstances to enable a microprocessor to receive and send data from and to other electronic devices. A UART translates parallel or serial data from one type of data line to a data format that can be understood by a microprocessor. The bus and microprocessor may be operating at different clock rates or via different protocols. The UART may operate with singular or dual clocks for receive and transmit and be able to perform data receives/transmits in either asynchronous or synchronous modes.

Various corporations create UARTs for parallel buses and multiple wire serial buses, such as RS232 and I²C buses. To date there is no UART capable of operating on a single wire bus. In particular, there is a need for a UART that can operate in conjunction with a microprocessor and a one-wire bus.

SUMMARY OF THE INVENTION

The present invention is a processor system that incorporates a UART adapted to operate on a one-wire bus. The UART can be a master or slave device on the one-wire bus. If the UART is a slave device it should contain a unique identification so as to distinguish the UART from other devices that may be connected to the one-wire bus.

Furthermore, the present invention may comprise a single integrated circuit that contains at least a microprocessor and one or more UARTs wherein at least one of the UARTs is a UART adapted to communicate on a one-wire or single wire data bus or network.

BRIEF DESCRIPTION OF THE DRAWINGS

Other objects, features, and characteristics of the present invention as well as methods of operation and functions of the related elements of structure, and the combination of parts and economies of manufacture, will become more apparent upon consideration of the following description and the appended claims with reference to the accompanying drawings, all of which form a part of this specification, and wherein:

DETAILED DESCRIPTION OF THE PRESENTLY PREFERRED EXEMPLARY EMBODIMENTS

An exemplary embodiment of the present invention comprises a universal asynchronous receiver/transmitter (UART) that incorporates "one-wire" input/output (I/O) circuitry. The one-wire I/O circuitry can take two forms. The UART can be a master one-wire UART ("master UART") or a slave one-wire UART ("slave UART"). The one-wire UART, either master or slave, is designed to operate in conjunction with a microprocessor. Thus, the microprocessor can communicate in a bidirectional manner via an exemplary one-wire UART over a one-wire data bus. A microprocessor can operate in conjunction with one or more one-wire UARTs wherein the UARTs can be either master or slave UARTs.

Figure 1:
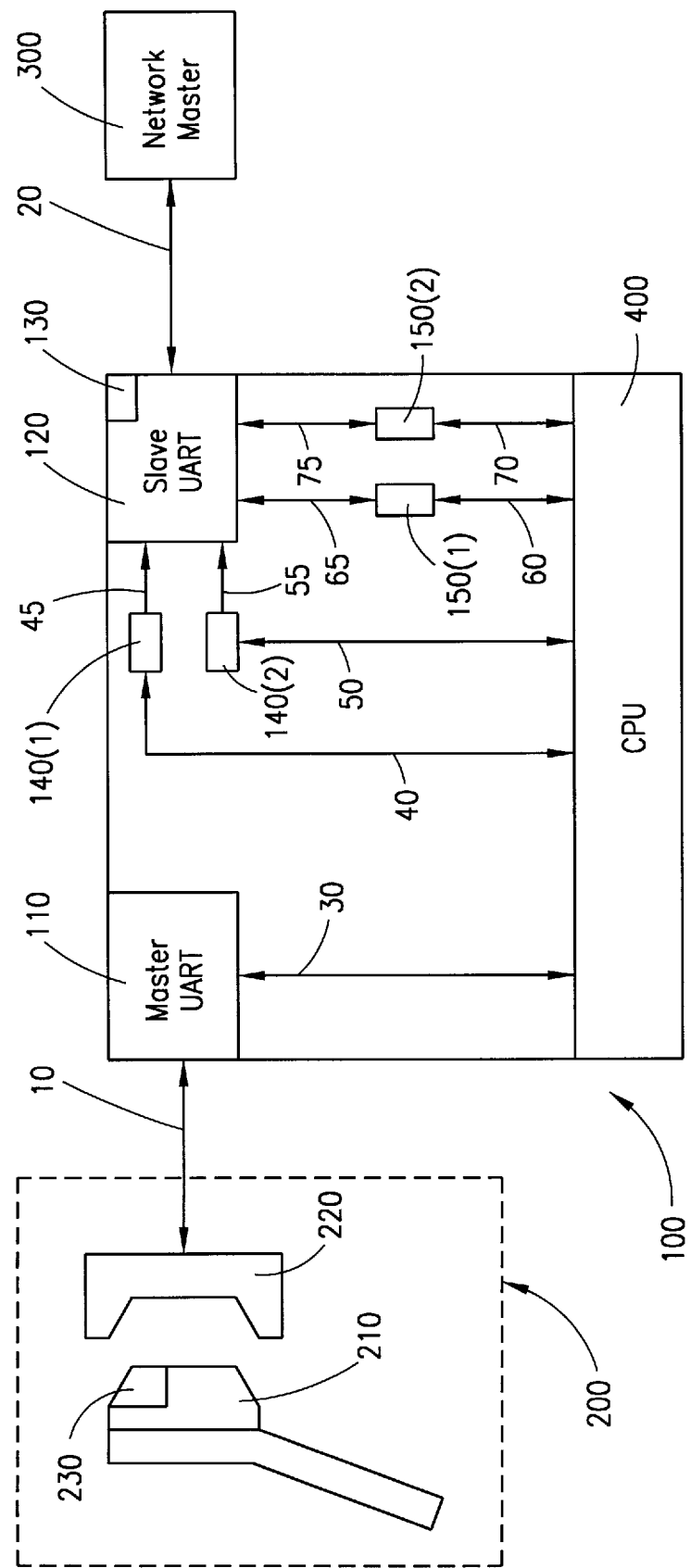
FIG. 1 is a block diagram of a first embodiment of an exemplary one-wire processor system.

Preferably, the combination of master UART and/or slave UART, and microprocessor are incorporated into a single integrated circuit or processor system, see FIG. 1, but it is understood that if more than one master one-wire UART is incorporated into the same integrated circuit that each should preferably communicate on separate one-wire networks.

An ordinary UART may be able to transmit and receive at the same time thereby allowing a microprocessor to communicate in a simultaneous bidirectional manner through a single UART. In the exemplary embodiments of the present invention one-wire UARTs cannot transmit and receive at the same time. Furthermore, a slave UART does not initiate communication. A slave UART replies based on what it is told to do via a one-wire network master circuit. A slave UART can operate on a one-wire bus with other slaves and one master. Furthermore, the slave UART preferably incorporates a unique identification (ID) for use on the one-wire bus.

A master UART is the controller, hence master, of its one-wire bus. The master UART is responsible for querying the slave circuits connected to the one-wire bus. A one-wire bus should only have one master.

The Dallas Semiconductor DS87C900 Lock Processor System specification dated Aug. 4, 1995 discusses many aspects of the present invention and is hereby incorporated by reference.

Referring to FIG. 1, there is shown a one-wire system which is comprised of a processor system 100 which is coupled to an identification (ID) source 200 by a line 10. The ID source 200 is a slave in accordance with one-wire communications protocol to a network master 300 by line 20. While FIG. 1 depicts one ID source 200 connected to line 10, it is understood that line 10 could be coupled to a plurality of ID sources 200 or to other devices which act as slaves in a one-wire network system. The processor system 100 is shown to be connected to line 20. Also, a plurality of processors similar in some aspects to processor system 100, or other devices which act as a one-wire slave, could be coupled to line 20 wherein network master 300 would act as a master for every lock processor system 100 or slave device coupled to line 20.

In FIG. 1, ID source 200 is comprised of an electronic key 210 and a key detector 220. Electronic key 210 is a slave device. Furthermore, the electronic key 210 contains an ID 230 which permanently stores a unique ID. According to Dallas Semiconductor Corporation's one-wire network protocol, every slave includes its own unique ID to facilitate the one-wire communication protocol.

The exemplary processor system 100 includes a master UART 110 which is coupled to ID source 200 by line 10. The master UART 110 initiates and controls communications over the one-wire network which, in this embodiment, includes line 10 and ID source 200. More specifically, master UART 110 and ID source 200 communicate over line 10 according to the one-wire protocol to form a one-wire network. This particular network consists of ID source 200, master UART 110, and line 10. As was stated before however, other ID sources or slave devices could be coupled to line 10 to form a more expansive network.

Processor system 100 also includes a CPU or microprocessor circuitry 400. Master UART 110 is electrically coupled to CPU 400 by bus 30. While the embodiment depicted in FIG. 1 shows that master UART 110 as well as CPU 400 are both integrated into a single integrated circuit, being the processor system 100, CPU 400 could be a separate integrated circuit, as could be master UART 110. Moreover, master UART 110 could be at least one port pin on the CPU 400 whose functionality is found within CPU 400. In the embodiment of FIG. 1, however, references to master UART 110 and to CPU 400 are references to actual circuits which are formed on a single silicon device. CPU 400 communicates with master UART 110 to thereby send and receive signals to and from ID source 200 over line 10.

Master UART 110 can communicate to CPU 400 via a variety of types of latches. Furthermore, a circular buffer (not shown) may be used to latch data between the master UART 110 and the CPU 400.

As was stated before, and in another embodiment of the present invention, the functionality of master UART 110 can be performed within CPU 400, wherein CPU 400 is connected directly to an output port which is connected to line 10 of FIG. 1. In an exemplary embodiment, CPU 400 may perform all of the processing necessary for transmitting data out of a port. An advantage of this exemplary embodiment is that fewer parts are needed. An advantage to the previous exemplary embodiment, namely one which includes a separate circuit that comprises master UART 110, is that a dedicated circuit acting as a master UART 110 reduces the amount of CPU 400 processing time required for data management, thereby allowing CPU 400 to perform other tasks. For example, in the embodiment where CPU 400 uses software and a standard port pin to emulate a master UART 110, the CPU 400 must perform all of the tasks normally performed by a UART, which includes setting up appropriate bit patterns for handshaking purposes, transmitting the appropriate signals for the appropriate duration of time, waiting a period of time for devices on the network to respond, and reading the responses.

The exemplary processor system 100 also includes a slave UART 120. The slave UART 120 is coupled to a network master 300 by line 20. The slave UART 120 includes an ID 130 for storing a unique ID. Thus, according to one-wire protocol, the unique ID 130 is used by network master 300 for facilitating communications over line 20. In an embodiment where a plurality of processors 100, and more specifically a plurality of slave UARTS 120, are coupled to line 20, network master 300 utilizes the unique IDs of each slave device to control and direct communications according to the one-wire communication protocol.

Continuing to refer to FIG. 1, the processor system 100 also includes a status register 140(1) and a status register 140(2). The status registers 140(1) and 140(2) are connected between slave UART 120 and CPU 400. Specifically, status register 140(1) is connected to CPU 400 by line 40 and to slave UART 120 by line 45 while status register 140(2) is connected to CPU 400 by line 50 and to slave UART 120 by line 55. Similarly, data register sets 150(1) and 150(2) are connected between slave UART 120 and CPU 400. Specifically, data register set 150(1) is connected to CPU 400 by line 60 and to slave UART 120 by line 65, while data register set 150(2) is connected to CPU 400 by line 70 and to slave UART 120 by line 75. The slave UART preferably uses circular buffers, not shown, for at least sending data bits from the slave UART 120 to the CPU 400 via the registers. The circular buffers operate differently than FIFOS. In summary, the exemplary processor system 100 comprises two UARTS, namely, a master UART 110 and a slave UART 120, wherein each one-wire UART 110 and 120 is connected to a separate one-wire network.

Figure 2:
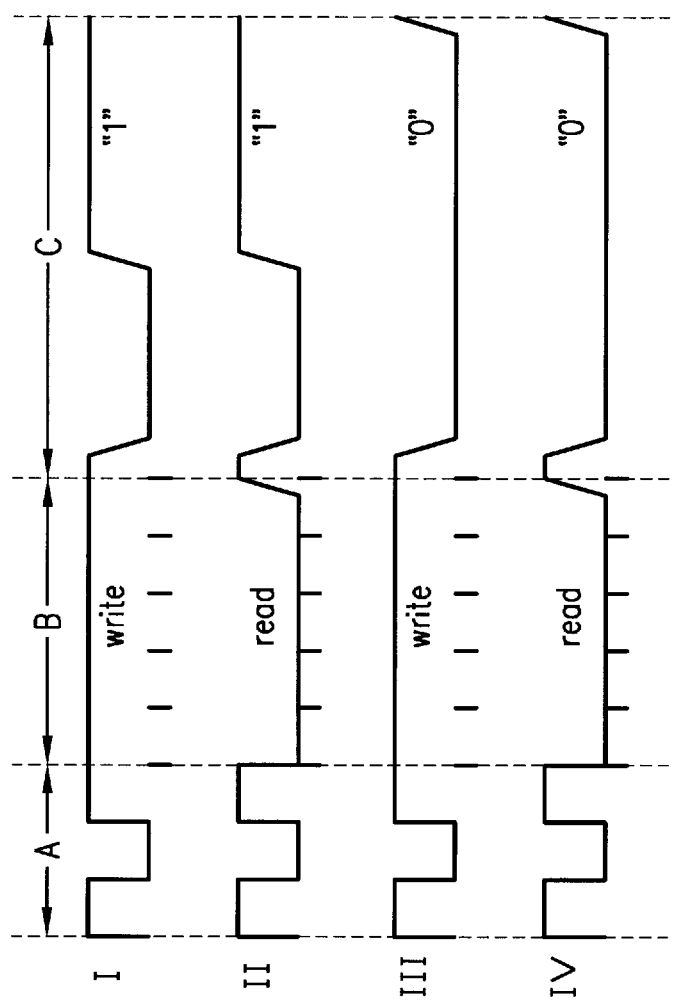
FIG. 2 is a timing diagram detailing the sections of various signals according to one-wire communications protocol.

Referring now to FIG. 2, there is shown a timing diagram which illustrates four fundamental data transfers according to the Dallas Semiconductor one-wire protocol. In general, a network master or master UART has the specific characteristic of being able to pull the onewire line high. When the line is pulled high the master waits a predetermined amount of time to see if a slave circuit will pull the line low. When the master circuit proceeds through its communication sequence with a slave it also initializes bus timing so that the master and the slave adopt a timing that is similar. More specifically, each of the four timing diagrams I–IV have a Section A which includes a start bit and two bits which are used for identification purposes. Each of the four timing diagrams I–IV in FIG. 2 also have a Section B which illustrates that a network master, for example master UART 110, uses the bits to specify whether electronic key 210, a slave, is to write a data pulse to the UART master 110 or to read a data pulse from master 110. Electronic key 210 is instructed by the UART master UART 110 to write a data pulse by the master UART 110 setting each of the five bits within Section B to a logic 1. Similarly, electronic key 210 is instructed to read a data pulse by the master UART 110 setting the five bits of Section B to a logic "0".

Section C is the data portion of the signal for each of the timing diagrams I–IV of FIG. 2. The beginning of the data portion is initiated by a falling edge. Under one-wire protocol, by way of example, the UART network master 110 of FIG. 1 raises the voltage level to a logic 1 on line 10 for a predetermined period of time after the leading edge whenever it is writing a logic 1 to electronic key 210 (slave) or whenever it expects electronic key 210 to write to the master UART 110. Under one-wire protocol, whenever master UART 110 reads from electronic key 210, the master attempts to raise the voltage level to a logic 1. Accordingly, in this embodiment, electronic key 210 writes a logic 1 by doing nothing and allowing the voltage level of line 10 to rise to a logic 1. Electronic key 210 writes a logic 0, however, by using its open collector architecture to pull the data line 10 low and preventing it from rising to a logic 1. Master UART 110 reads the state of the line 10 to determine whether the electronic key 210 is writing a logic 1 or a logic 0 within an allotted time. A situation in which network master 110 does not attempt to raise the voltage level of line 10 to a logic 1 is when it is writing logic 0 to the slave.

A unique one-wire port configuration is required in order to facilitate one-wire communications. Referring again to FIG. 1, the one-wire communications protocol requires that a slave, in this case the electronic key 210, be able to pull down line 10 despite the master UART 110's attempt to increase the voltage level of line 10 to a logic 1. Thus, whenever the slave on the network pulls down the data line, the master UART 110 will read a voltage level on its one-wire pin which is different than the voltage level that the master UART 110 is trying to achieve on its one-wire pin. Accordingly, electronic key 210 writes a logic 1 by allowing the master UART 110 to drive the voltage level of the line to a logic 1. Similarly, electronic key 210 writes a logic 0 by driving down the voltage level of line 10 to a logic 0 so that master UART 110 will read a logic 0 even though it is trying to write a logic 1.

This protocol can be implemented, by way of example, by utilizing an open collector or similar architecture within the electronic key 210 or within any slave, because such architecture requires little power to "write" a logic "0" data pulse. Moreover, no power is required on the part of the slave to "write" a logic 1 because a logic 1 is written by inaction on the part of the electronic key 210, namely, by allowing master UART 110 to increase the voltage level of line 10 to a logic 1.

The master UART 110, the slave UART 120 and the processor system 100 are especially adapted for processing signals according to the Dallas Semiconductor Corporation one-wire protocol as described above. While the one-wire protocol is defined in other related applications, it is described herein in this application so as to help define some of the features of master UART 110, slave UART 120, electronic key 210 and network master 300.

Data transfers occur one logic state at a time, wherein the transmission of every logic state requires handshaking signals. Moreover, a slave device can never initiate communications on its own. According to the one-wire protocol, a slave UART 120 can only transmit and receive data upon initiation by the network master 300.

The fact that a slave UART 120 cannot initiate communications does not mean that the slave UART cannot decide what data it seeks to transfer to the network master 300. More specifically, an exemplary embodiment incorporates data register 150(1) and status register 140(1) for storing data to be sent to the network master 300 and indicating that the microprocessor 400 wants to send data respectively. When there is a read command from the network master 300 in accordance with Section B of FIG. 2, the slave UART indicates to the master that there is data to be sent and then sends the data over the one-wire bus 20 via one-wire protocol. Conversely, status register 140(2) indicates that microprocessor 400 is to receive data from the network master 300 and data register 150(2) is used to pass the data from the slave UART 120 to the microprocessor 400.

Furthermore, as a part of the one-wire protocol, network master 300 periodically interrogates status registers similar to registers 140(1) and 140(2) of the various systems on its network to determine which slave UARTS 120 have data to be transferred to network master 300 and the amount of data to be transferred. Thereafter, network master 300, using the protocol discussed above in relation to FIG. 2, initiates the data transfers to obtain the data from the data register set 150(1) or 150(2).

Figure 3:
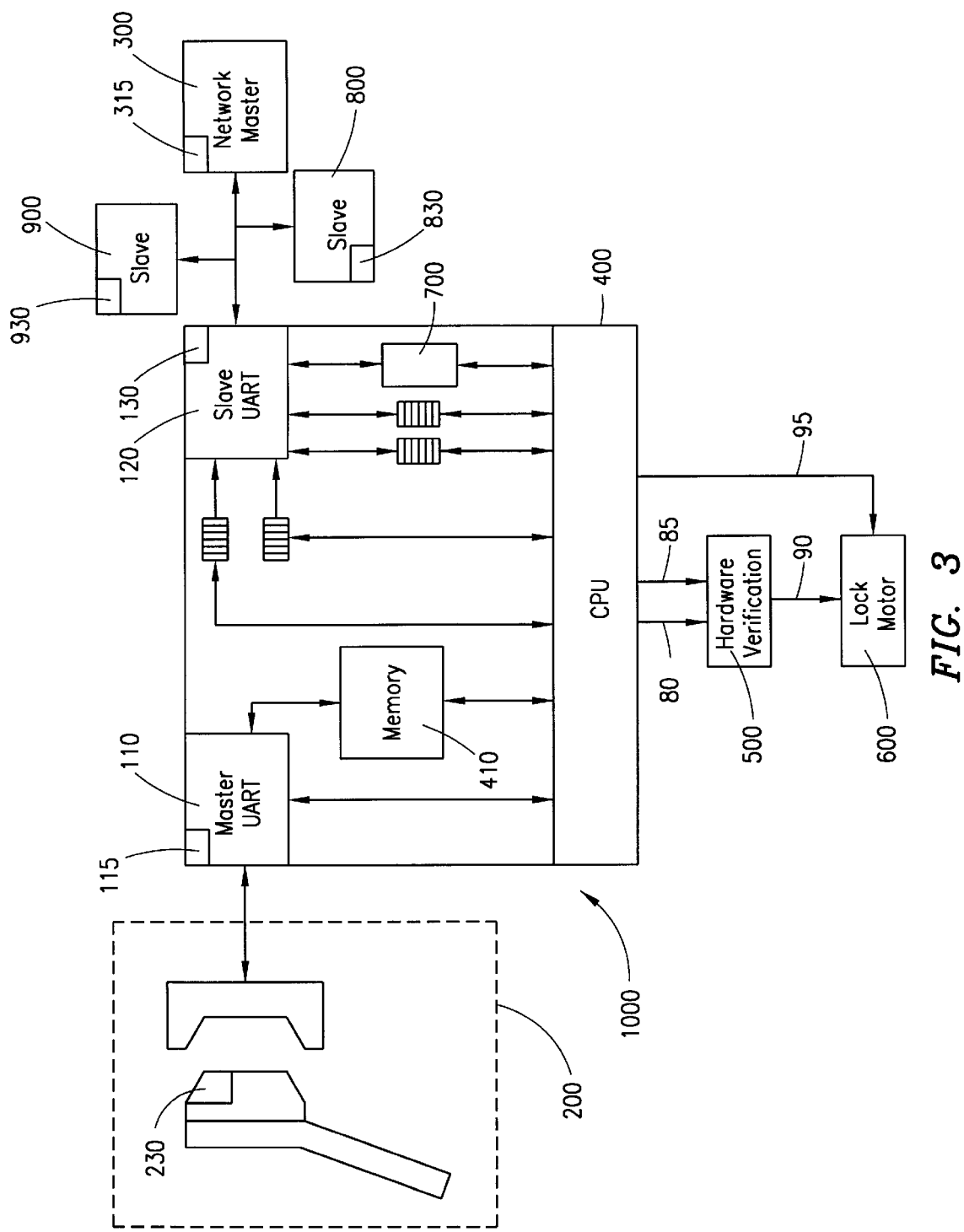
FIG. 3 is a block diagram of a second embodiment of an exemplary one-wire processor system.

Referring now to FIG. 3, there is shown another embodiment of the invention wherein a processor system 1000 is coupled to a hardware verification circuit 500 for actuating a lock motor 600 whenever a unique slave ID, stored in slave ID store 230 of ID source 200, is valid. Hardware verification circuit 500 receives from CPU 400 over line 80 a signal reflecting at least a portion of the ID transmitted by ID source 200 over line 10 as well as an equivalent ID portion stored within memory 410 of processor system 1000, which equivalent ID portion is received over line 85. Thus, hardware verification circuit 500 compares the received ID portion over line 80 to the stored ID portion received over line 85 and only sets an actuation signal on line 90 to actuate lock motor 600 upon the occurrence of a match between the stored ID portion and the received ID portion.

It is understood that the processor system 1000 can be used in a wide variety of applications wherein it would be advantageous to use the one-wire communication protocol. Such systems include systems where the wiring of the data and power lines to the processor must be kept to a minimum, i.e., one single wire plus a ground connection. Applications that may desire the use of a one-wire data bus and microprocessor control include aircraft applications, access applications, temperature gauge, robotic applications, applications where weight or size must be kept to a minimum, security locks, security systems, identification systems, access control systems, subsystem control, monetary exchange, or verification systems.

The processor system 1000 of FIG. 3 also includes a timing controller 115 for controlling the timing of master UART 110. According to one aspect of the present invention, timing controller 115 improves data transfer efficiencies over the network by determining the maximum amount of time required for a slave on the network, namely ID source 200, to respond so that the master UART 110 will wait less than a prespecified amount of time, wherein the prespecified amount of time is one which is selected to be long enough to operate any associated slave device. Accordingly, timing controller 115 tends to cut out unnecessary waiting thereby increasing the overall efficiency of network communications.

The timing controller 115 can be included in any device which acts as a network master. Thus, the network master 300 connected to the processor system 1000 may also include a timing controller 315 for controlling communications timing for the network that consists of the slaves 800 and 900, the processor system 1000, and network master 300.

The slaves 800 and 900 may also be processor systems similar to the processor system 1000. Each slave circuit should have its own unique ID stored in, for example, ID store 830 and 930. The IDs are used for address and identification purposes when a master circuit (UART or other) communicates on the one-wire bus.

Based on the foregoing, those skilled in the art will understand that the present invention provides a master or slave UART that incorporates a one-wire protocol capability. The one-wire UART of the present invention enables a microprocessor to communicate to other circuits via a one-wire bus. It is further understood that the invention is not limited to communication via one-wire protocol, but instead may incorporate any digital data protocol for use on a single wire communication bus. A few preferred embodiments have been depicted and described. It will be appreciated by those skilled in the art that changes may be made in these embodiments without departing from the principles and spirit of the invention, the scope of which is defined by the appended claims.

What is claimed is:

1. A processor system capable of communicating on a one-wire network, said processor system comprising:

a microprocessor on an integrated circuit, a first UART, on said integrated circuit, connected to said microprocessor, said first UART for communicating on a first single wire bus to a first external circuit, said first UART is a slave device that further comprises an identification that can be communicated on said first single wire bus.

2. The processor system of claim 1, wherein said first UART is a master device on first said single wire bus.

3. The processor system of claim 1, wherein said first single wire bus is a one-wire bus, said one-wire bus adapted to use one-wire protocol.

4. The processor system of claim 1, further comprising a second UART, on said integrated circuit, connected to said microprocessor, said second UART adapted to communicate on a second single wire bus to a second external circuit.

5. The processor system of claim 4, wherein said second UART is a slave device on said second single wire bus.

6. The processor system of claim 5, wherein said second UART comprises an identification that can be communicated on said single wire bus.

7. The processor system of claim 4, wherein said second UART is a master device on said second single wire bus.

8. The processor system of claim 4, wherein said second single wire bus is a one-wire bus adapted to use a one-wire protocol.

9. An integrated circuit comprising:

a microprocessor;

a first UART, connected to said microprocessor, adapted to communicate on a one-wire data network to at least one external circuit, said first UART is a slave device which comprises an identification means.

10. The integrated circuit of claim 9, further comprising a second UART.

11. The integrated circuit of claim 10, wherein said second UART is adapted to communicate on a single wire data network.

12. The integrated circuit of claim 9, wherein said first UART is a master device on said one-wire network.

13. The integrated circuit of claim 9 wherein said microprocessor is for controlling at least one other device not connected to said one-wire data network.

14. The integrated circuit of claim 13, wherein said at least one other device is a electromechanical lock.

15. The integrated circuit of claim 9, wherein said microprocessor is for at least one of controlling access, verifying an identification, controlling an operation, and enabling an exchange of units of value.

\* \* \* \* \*